(12) United States Patent
Sokolofsky

(10) Patent No.: US 8,584,541 B2
(45) Date of Patent: Nov. 19, 2013

(54) ANTI-BACKLASH/ANTI-RATTLE LEVER

(75) Inventor: Phillip M. Sokolofsky, Akron, NY (US)

(73) Assignee: Delphi Technologies, Inc., Troy, MI (US)

( * ) Notice: Subject to any disclaimer, the term of this patent is extended or adjusted under 35 U.S.C. 154(b) by 299 days.

(21) Appl. No.: 13/035,017

(22) Filed: Feb. 25, 2011

(65) Prior Publication Data
US 2012/0216636 A1 Aug. 30, 2012

(51) Int. Cl.
*F16H 21/18* (2006.01)
*F16H 21/14* (2006.01)
*F16H 21/48* (2006.01)
*G05G 1/00* (2008.04)

(52) U.S. Cl.
USPC ..................... 74/48; 74/69; 74/470

(58) Field of Classification Search
USPC ......... 74/22 A, 25, 38, 39, 40, 42, 43, 44, 45, 74/48, 49, 50, 51, 52, 53, 55, 409, 108, 69, 74/837, 490, 470; 403/61, 329; 137/247.19, 384.8; 267/141, 267/141.1–141.7, 161, 162, 247, 262, 263; 251/227, 229, 232, 237, 239, 246; 292/57, 143, 144, 152, 240, 341.2, 292/359, DIG. 38, DIG. 61, DIG. 62, DIG. 73
See application file for complete search history.

(56) References Cited

U.S. PATENT DOCUMENTS

| 984,474 A * | 2/1911 | Dann .......................... 248/240 |
| 3,055,273 A * | 9/1962 | Thomas ........................ 409/146 |
| 3,756,191 A * | 9/1973 | Olah .......................... 455/155.1 |
| 4,569,638 A * | 2/1986 | Harker et al. .................. 417/365 |
| 4,612,822 A * | 9/1986 | Nishikawa et al. .............. 74/493 |
| 4,810,014 A * | 3/1989 | McGourty et al. ............. 292/144 |
| 4,875,388 A | 10/1989 | Bouvot |
| 5,069,112 A * | 12/1991 | Takayama et al. ............. 454/162 |
| 5,299,469 A | 4/1994 | Meyer et al. |
| 5,584,098 A * | 12/1996 | Koyama et al. ................. 16/441 |
| 6,027,784 A | 2/2000 | Taguchi |
| 6,431,266 B1 | 8/2002 | Han |
| 6,578,446 B2 | 6/2003 | Staser et al. |

(Continued)

FOREIGN PATENT DOCUMENTS

EP 1174301 A2 1/2002

OTHER PUBLICATIONS

EP Search Report dated May 3, 2012.

*Primary Examiner* — David M Fenstermacher
*Assistant Examiner* — Jake Cook
(74) *Attorney, Agent, or Firm* — James M. Chan

(57) ABSTRACT

An anti-backlash assembly of the type for transferring motion via a pin movable along a slot. The assembly comprises a pivot lever and a second lever member. The pivot lever comprises a body portion and a pivot lever portion extending from the body portion to a pivot lever distal end. The pivot lever portion defines a pin engagement slot extending from adjacent the pivot lever distal end toward the body portion. A pair of fingers extend in parallel and spaced relationship from the pivot lever distal end of the pivot lever portion toward the body portion to engage opposite sides of a pin of the engagement arm. Each of the fingers includes a pin engaging section extending to an inwardly extending distal end and a spring section extending in a for urging the fingers into clamping engagement with the pin.

5 Claims, 1 Drawing Sheet

(56) References Cited

U.S. PATENT DOCUMENTS

| | | | |
|---|---|---|---|
| 6,659,504 B2 * | 12/2003 | Manwaring et al. | 280/777 |
| 7,311,017 B2 | 12/2007 | Shimizu | |
| 7,836,860 B2 | 11/2010 | Edgar | |
| 8,220,355 B2 * | 7/2012 | Rouleau et al. | 74/495 |
| 2002/0108460 A1 | 8/2002 | Nishishita | |
| 2012/0216636 A1 * | 8/2012 | Sokolofsky | 74/48 |

* cited by examiner

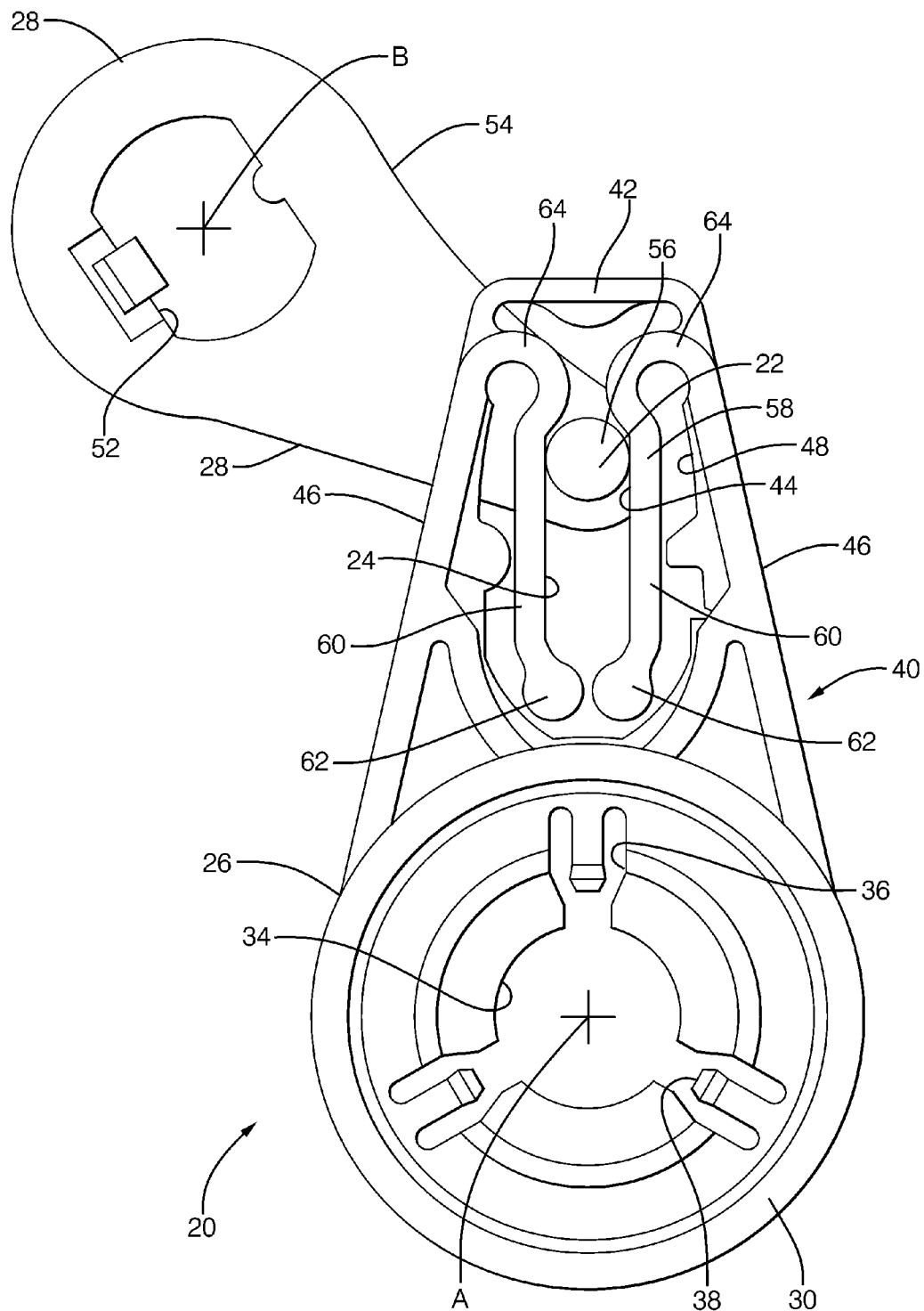

ANTI-BACKLASH/ANTI-RATTLE LEVER

BACKGROUND OF THE INVENTION

1. Field of the Invention

An anti-backlash assembly of the type for transferring motion via a pin movable along a slot.

2. Description of the Prior Art

The lever assembly to which the subject invention pertains transfers rotary motion to motion of the pin along the a slot, or vice versa. One such lever is disclosed in U.S. Pat. No. 6,658,957 granted to Nishishita, which discloses an lever assembly with a pivot lever including a body portion disposed in a plane for disposition on a shaft on an axis and a pivot lever portion extending radially from the body portion to a pivot lever distal end. A second lever member is coupled to the pivot lever with the coupling including a pin engagement slot and a pin slideable along the slot.

Such prior art levers are successful, however, too much of a gap may exist between the pin and the slot, allowing too much tolerance. This gap can cause the pin to rattle within the slot throughout its range of movements.

SUMMARY OF THE INVENTION

The invention provides for an anti-backlash assembly wherein the coupling includes a slot defined by a pair of fingers extending in parallel and spaced relationship for moving relative to one another to constantly engage opposite sides of the pin.

The advantage of the invention is that the fingers are independent and moveable relative to one another constantly engage the pin throughout its motion within the slot. As a result, the gap between the pin and slot is eliminated and as well as the rattling noises of the prior art systems.

BRIEF DESCRIPTION OF THE DRAWING

Other advantages of the present invention will be readily appreciated, as the same becomes better understood by reference to the following detailed description when considered in connection with the accompanying drawings wherein:

FIG. 1 is a plane view of an embodiment of the anti-backlash lever assembly constructed in accordance with the subject invention.

DETAILED DESCRIPTION OF THE ENABLING EMBODIMENTS

Referring to the Figures, wherein like numerals indicate corresponding parts throughout the several views, an embodiment of the anti-backlash assembly 20 of the type for transferring motion via a pin 22 movable along a slot 24 comprising in accordance with the subject invention is generally indicated in FIG. 1.

The anti-backlash assembly 20, as generally indicated, includes a pivot lever 26 and a second lever member 28. The pivot lever 26 includes a body portion 30 having a circular shape and disposed in a plane P on a shaft 32 (not shown) on an axis A extending perpendicularly to the body. The body portion 30 defines a mounting hole 34 having a circular shape extending through the body portion 30 and disposed along the axis A. The body portion 30 defines a plurality of apertures 36 extending radially from the mounting hole 34 and having a U-shape to define a radial tooth 38 extending inwardly from the body portion 30 toward the mounting hole 34 in each of the apertures 36 for establishing a secured relationship between the body portion 30 and the shaft 32. The pivot lever 26 in the preferred embodiment is fabricated from plastic, however, the pivot lever 26 can also be fabricated from metal or other types of steel.

The pivot lever 26 includes a pivot lever portion 40 each extending radially to a pivot lever distal end 42. Alternatively, the pivot lever 26 may also include a valve lever portion extending radially to a valve lever distal end 44 for the attachment of a valve to the pivot lever 26.

The pivot lever portion 40 has a trapezoidal shape and includes a pair of sides 46 diverging downwardly in a spaced relationship between the pivot lever distal end 42 and the body portion 30 to define an opening 48 between the sides 46 and the pivot lever distal end 42. The pivot lever portion 40 also defines a pin engagement slot 24 extending from the pivot lever distal end 42 toward the body portion 30 and spaced from the sides 46.

The second lever member 28 has a circular shape disposed in said plane P on a second shaft 50 (not shown) on a second axis B extending perpendicularly to said plane P. The second lever member 28 defines a mounting aperture 52 having a elliptical shape extending through the second lever member 28 and disposed along the second axis B. The second lever member 28 includes an arm 54 having a triangular shape extending from the second lever member 28 to a distal end 44. The arm 54 includes a lever attachment pin 22 extending perpendicularly from the distal end 44 of the second lever member 28. The lever attachment pin 22 is disposed into the pin engagement slot 24 of the pivot lever 26 coupling 56 the second lever member 28 to the pivot lever 26.

In the preferred embodiment, the pin engagement slot 24 is defined by a pair of fingers 58 extending in parallel and spaced relationship from the pivot lever distal end 42 of the pivot lever 26 toward the body portion 30. Each of the fingers 58 includes a pin engaging section 60 extending to an inwardly extending distal end 62 and a spring section 64 extending in a semi-circular path to interconnect the pin engaging section 60 to the adjacent side 46 of the pivot lever portion 40 for urging the fingers 58 toward one another into clamping engagement with a pin 22 of the engagement arm 54. In other words, the pin engaging section 60 of the fingers 58 are in constant contact with the pin 22 throughout its motion within the pin engagement slot 24. As a result, noises, caused by the pin 22 rattling within the pin engagement slot 24 can be reduced. Furthermore, the semi-circular path of the spring section 64 traps the pin 22 within the pin engagement slot 24 for eliminating any backlash effects. Also, in an alternatively embodiment, the pair of fingers 58 may be constructed to extend away from the body portion 30 toward the pivot lever distal end 42 and in a paralleled and spaced relationship for engaging the pin 22.

According to the preferred embodiment, the lever attachment pin 22 is disposed within the pin engagement slot 24 and the second lever member 28 is operated so that both the arm 54 and the lever attachment pin 22 of the second lever member 28 has a rotary motion. However, being disposed within the pin engagement slot 24, the lever attachment pin 22 is being limited to only having a rectilinear motion. In other words, the pivot lever 26 transfers the rotary motion of the lever attachment pin 22 of the second lever member 28 to a rectilinear motion within the pin engagement slot 24. Additionally, a linear arm attachment pin can be disposed on one of the sides 46 of the pivot lever portion 40 for the attaching the pivot lever 26 to an linear arm for transferring the movement of the pivot lever 26 to the linear arm. Alternatively, the pin engagement slot 54 may be disposed on the second lever member 28 and the lever attachment pin 22 may be disposed on the pivot lever portion 40. For this alternative embodiment, instead of transferring rotary motion to rectilinear motion, the pivot lever 26 will transfer the rectilinear motion of the second lever member 28 to a rotary motion. In other words, the anti-backlash assembly 20 successfully transfers the movement of the shafts 32,50 (not shown) without any slippage.

While the invention has been described with reference to an exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An anti-backlash assembly of the type for transferring motion via a pin movable along a slot comprising;
    a pivot lever including a body portion is disposed in a plane,
    a pivot lever portion extends radially from said body portion to a pivot lever distal end,
    a second lever member and a coupling to said pivot lever for movement therewith,
    said coupling including a pin engagement slot and a pin slideable along said slot,
    said slot being defined by a pair of fingers extending in parallel and spaced relationship for moving relative to one another to constantly engage the pin,
    wherein each of said fingers includes a spring section extending in a semi-circular path from said pivot lever portion and transitioning into a pin engaging section having an inwardly extending distal end opposite that of said spring section,
    wherein said spring sections urge said fingers toward one another such that said pin engaging sections maintain a clamping engagement to said pin throughout motion of said pin within said slot.

2. An assembly as set forth in claim 1 wherein said pivot lever portion include sides extending downwardly from said pivot lever distal end to define an opening between said sides and said pivot lever distal end, each of said fingers being disposed in free space in said opening.

3. An assembly as set forth in claim 1 wherein said body portion defines a mounting hole disposed about an axis.

4. An assembly as set forth in claim 3 wherein said body portion defines a plurality of apertures each extending radially from said mounting hole.

5. An assembly as set forth in claim 4 wherein each of said apertures includes a radial tooth extending inwardly from said body portion toward the shaft.

* * * * *